March 13, 1928.  1,662,544

D. M. SOLENBERGER

PISTON RING

Filed March 1, 1926   2 Sheets-Sheet 1

Inventor
Dean M. Solenberger

By Whittemore Hulbert Whittemore
& Belknap
Attorneys

March 13, 1928.  1,662,544

D. M. SOLENBERGER

PISTON RING

Filed March 1, 1926  2 Sheets-Sheet 2

Inventor
Dean M. Solenberger

By Whittemore Hulbert Whittemore
  Belknap  Attorneys

Patented Mar. 13, 1928.

1,662,544

UNITED STATES PATENT OFFICE.

DEAN M. SOLENBERGER, OF KANSAS CITY, MISSOURI, ASSIGNOR TO SIMPLEX PISTON RING COMPANY, OF CLEVELAND, OHIO, A CORPORATION OF OHIO.

PISTON RING.

Application filed March 1, 1926. Serial No. 91,601.

The invention relates to piston rings and more particularly to constructions designed to eliminate piston slap. In the present state of the art, piston rings are usually freely movable in the ring grooves so as to maintain sealing contact with the walls of the cylinder. Where such rings are placed in pistons loosely fitting the cylinder they may produce an effective seal but will not prevent piston slap. With certain constructions resilient expanders are placed between the rings and the bottom of the ring grooves but while this added radial pressure tends to center the piston, it does not completely eliminate slap. This is for the reason that such resilient radial pressure is balanced upon opposite sides of the piston and when any force is exerted to displace the piston from the central position, such force is stored in the expander and will be given back in a recoil with the result that the amplitude of oscillation is increased and under certain conditions the slap is intensified.

To overcome the difficulty above described I have designed a construction in which a preponderance of pressure is exerted upon one side of the piston tending to hold it in permanent contact with one wall of the cylinder and the invention consists in the construction as hereinafter described.

Figure 1:
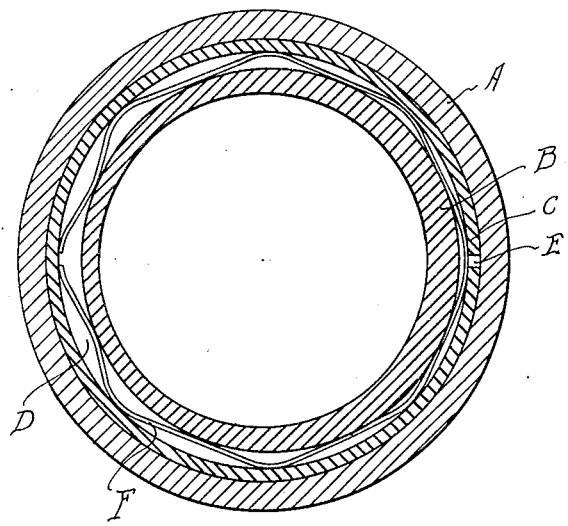
Figure 1 is a cross section through a cylinder and piston illustrating my improved construction.
Figure 2:
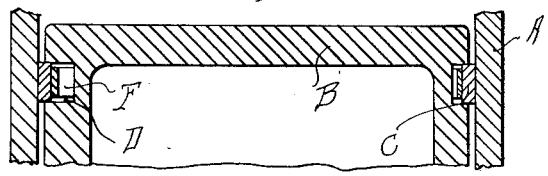
Figure 2 is a longitudinal section thereof.

Figures 3, 4, 5, 6, and 7 show modified constructions. As shown in Figures 1 and 2 A is a cylinder, B the piston loosely fitting the same so as to be capable of a considerable degree of lateral movement. C is a piston ring engaging an annular groove D in the piston, said ring being split as indicated at E. F is a resilient expander in the form of a corrugated ribbon which is placed between the ring and the bottom of the ring groove.

Instead of making the ring groove D concentric with the axis of the cylinder, it is eccentric so as to have a much greater depth on one side than the other. This will provide a greater space for expansion of the expander F on the deep side of the groove with the result that where the ring is concentric with the piston the tension of the expander thereon will be much greater on the one side than the other. Consequently in operation the piston will be maintained in contact with one wall of the cylinder by the preponderance of pressure tending to force it to such side.

Figure 3:
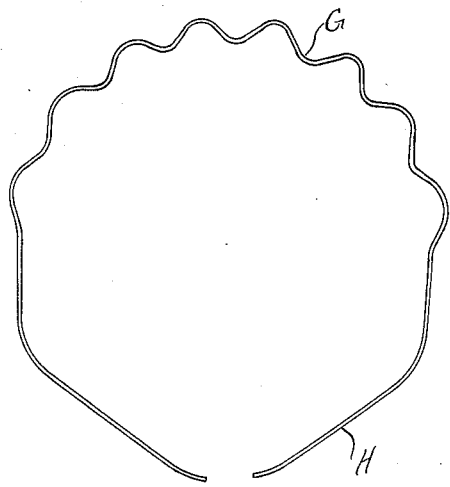

Instead of producing this preponderance of pressure by the construction shown in Figures 1 and 2, it may be accomplished as shown in Figure 3 by using an expander having short deep corrugations G on one side thereof and long shallow corrugations H on the opposite side.

Figure 4:
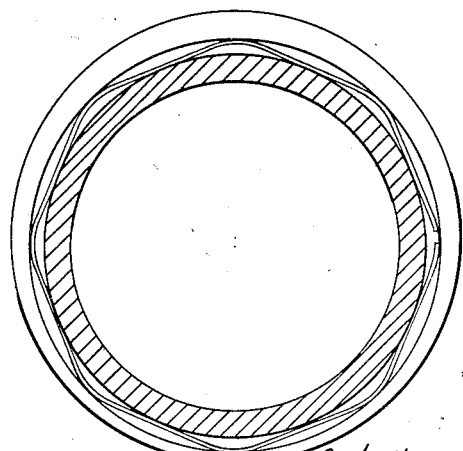

Another modification is shown in Figure 4 where the expander is uniform and the depth of the ring groove is equal on all sides but the inner and outer surfaces of the ring are eccentric.

Figure 5:
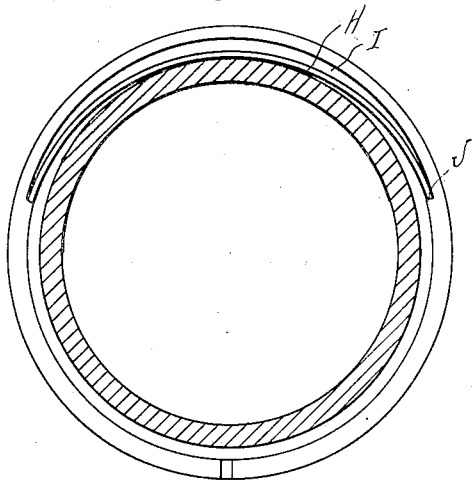

Still another modification is shown in Figure 5 where a segmental expander H is applied to one side only of the ring, this being located in a recess I in said ring having abutments J for holding the expander from displacement.

Figure 6:
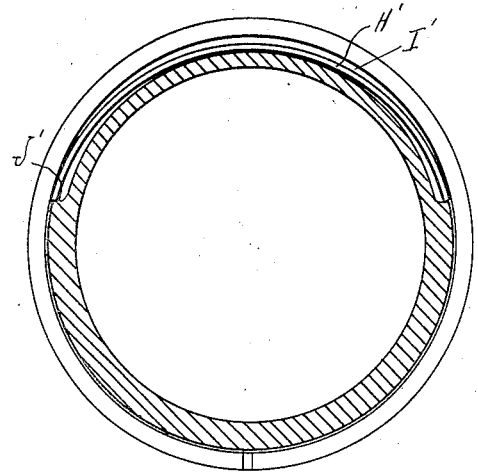

Figure 6 shows a similar construction where the segmental expander H' is placed in a recess I' having greater depth than the balance of the ring groove and forming shoulders J' for the ends of the expander.

Figure 7:
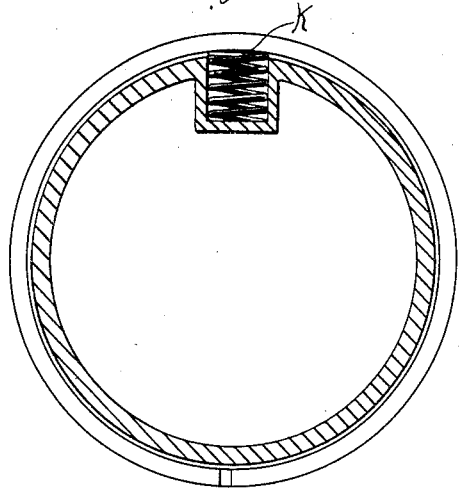

In Figure 7 a coil spring K is located in a recess in one side of the piston and bears against a ring on that side only.

With all of the various modifications the same effect is produced, viz, the forcing of the piston against one wall of the cylinder and maintaining it in such contact against any force which tends to displace it.

What I claim as my invention is:

1. The combination with a cylinder and a piston loosely fitting the same, of a ring engaging the groove in said piston and a ribbon expander located between the ring and the bottom of the groove having a corrugated portion for exerting a perponderance of pressure against said ring on one side of the axis of the cylinder.

2. The combination with a cylinder and a piston loosely fitting the same, of a ring engaging a groove in said piston and a ribbon expander located between said ring and the bottom of the groove, said expander having deeper corrugations in a portion thereof at one side of the axis of the cylinder than those in the portion on the diametrically opposite side of said axis whereby a preponderance of pressure is exerted on said ring on one side.

3. The combination with a cylinder and a piston having a groove therein, of a ring engaging the groove in said piston, and a corrugated ribbon expander located between the ring and the bottom of the groove, the said parts being proportioned to produce a preponderance of radial pressure in one direction.

In testimony whereof I affix my signature.

DEAN M. SOLENBERGER.